3 Sheets—Sheet 1.

J. S. CONANT.

Sewing Machine.

No. 3,214.

Reissued Nov. 24, 1868.

Witnesses:

Geo. Collins.
Thos. J. Baldwin.

Inventor:

Jotham S. Conant,

N. PETERS, Photo-Lithographer, Washington, D. C.

3 Sheets—Sheet 2.

J. S. CONANT.

Sewing Machine.

No. 3,214.

Reissued Nov. 24, 1868.

Witnesses.
Geo. H. Collins
Thos. J. Baldwin

Inventor
Jotham S. Conant

3 Sheets—Sheet 3.

J. S. CONANT.

Sewing Machine.

3,214. Reissued Nov. 24, 1868.

Witnesses.

Geo. H. Collins.
Thos. J. Baldwin.

Inventor:

Gotham S. Conant.

United States Patent Office.

JOTHAM S. CONANT, OF HACKENSACK, NEW JERSEY, ASSIGNEE, BY MESNE ASSIGNMENTS, OF HIMSELF.

*Letters Patent No.* 12,233, *dated January* 16, 1855; *reissue No.* 3,214, *dated November* 24, 1868.

IMPROVEMENT IN SEWING-MACHINES.

The Schedule referred to in these Letters Patent and making part of the same.

*To all whom it may concern:*

Be it known that I, JOTHAM S. CONANT, formerly of New York, in the county of New York, and State of New York; at present residing in Hackensack, in the county of Bergen, and State of New Jersey, have invented certain new and useful Improvements in Sewing-Machines; and I hereby declare the following to be a full, clear, and exact description of the same, reference being had to the annexed drawings, making part of this specification, in which—

Figure 1:
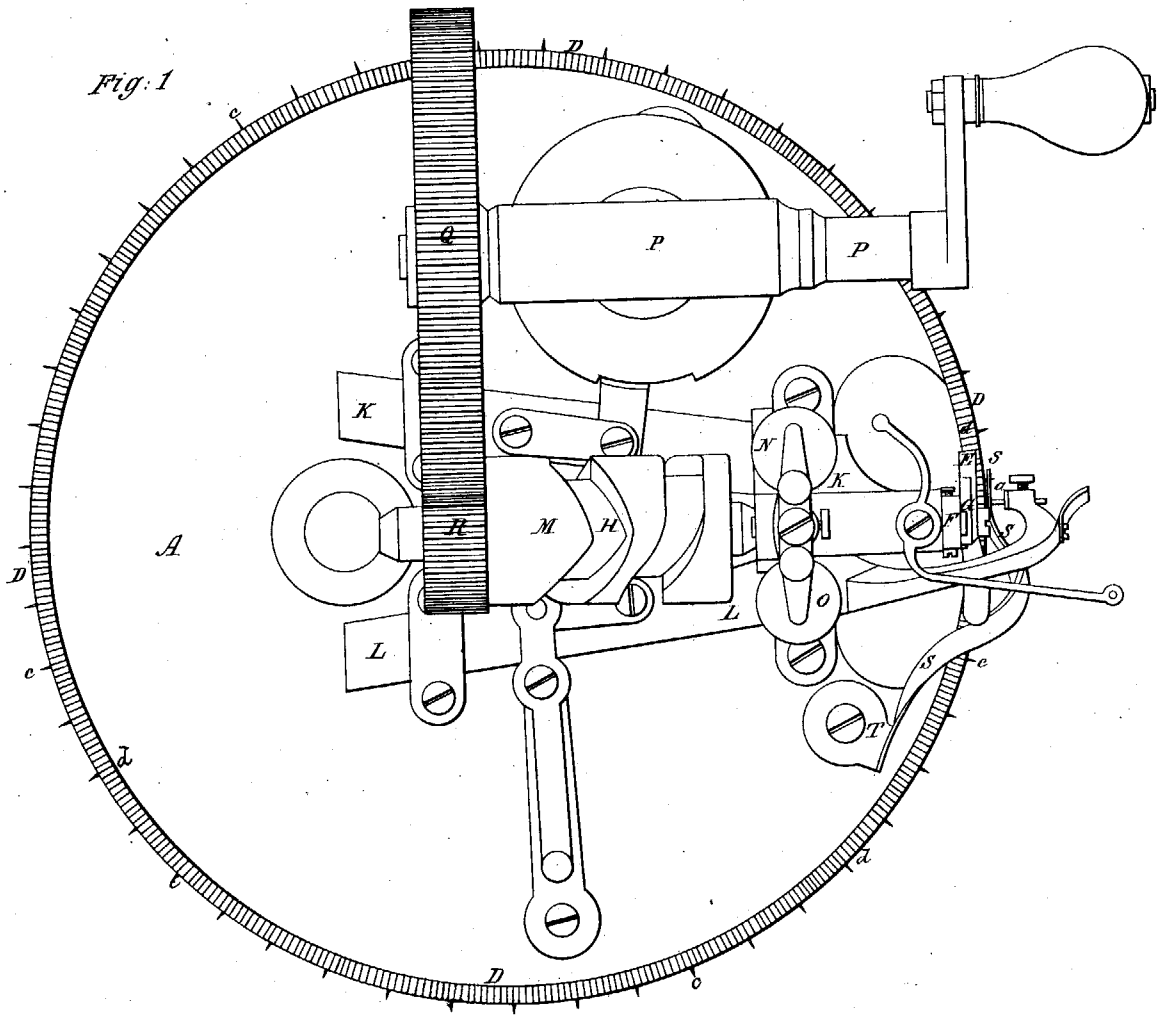

Figure 1 is a top view of the machine, with my improvements attached.

Figure 2:
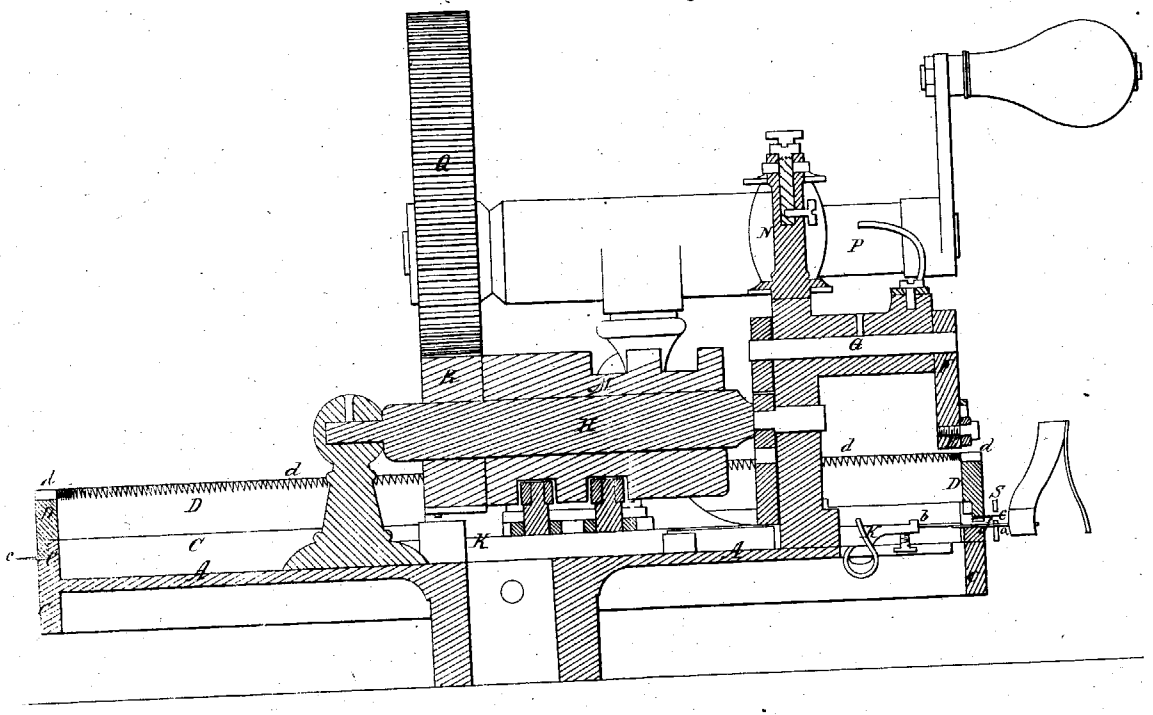

Figure 2, a vertical section, upon the line of fig. 1.

Figure 3:
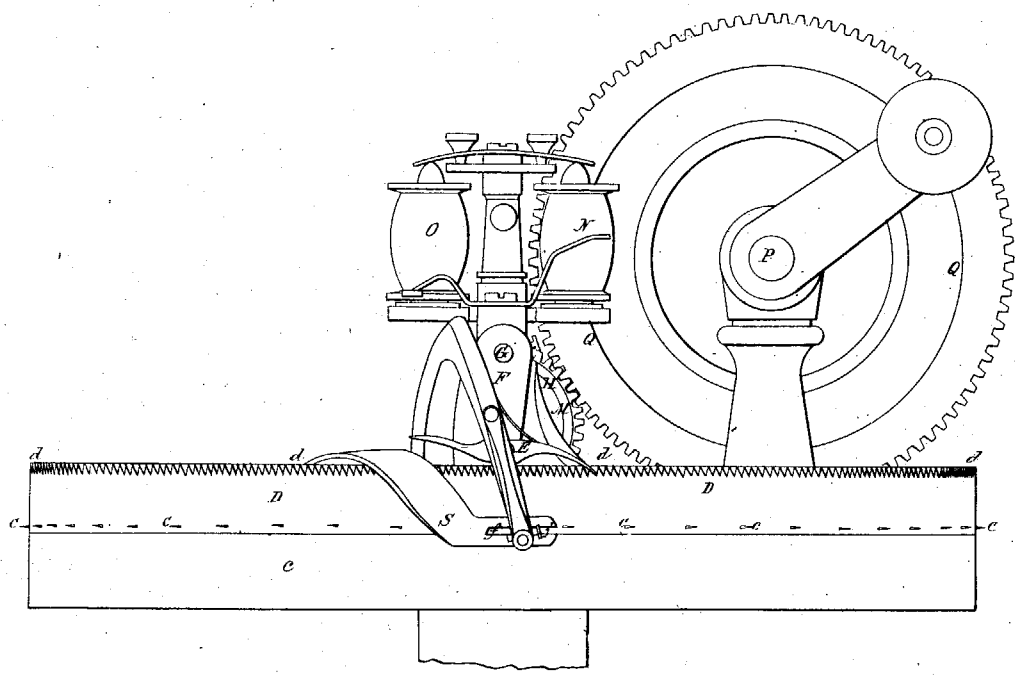

Figure 3, a front elevation.

My improvements may be applied to any description of sewing-machine, but I have represented them, in the accompanying drawings, as attached to one recently invented by Sherburne C. Blodgett, of Georgetown, Massachusetts, and which operates with two reciprocating needles penetrating the cloth from opposite sides.

The description and drawings of this machine are already in the Patent Office, and it will not, therefore, be necessary to enter into the details of its construction, except so far as may be requisite to illustrate their connection with and relation to my present invention.

My improvement is upon the feed-bar or other contrivance by which the cloth is moved for the purpose of making the successive stitches. Heretofore, this has consisted of a straight or curved bar, to which the goods were attached, and which was fed through the machine from end to end, the operation of sewing requiring to be interrupted, from time to time, that the feed-bar might be withdrawn and the goods attached thereto, when it was again entered at the other side of the machine. This involved a considerable consumption of time, and was accompanied by other inconveniences, all of which my present invention is designed to remove.

My improvement consists in the use of an endless feeder, revolving intermittently, and so constructed as to supply the cloth to the needles without the necessity, at any time, of stopping the machine for the purpose of attaching the goods to the feed-bar, as has heretofore been the case.

To enable others skilled in the art to make and use my invention, I will proceed to describe the method which I have adopted of carrying it out.

A is the horizontal base-plate or table of the machine, which may be made circular, or of such other form as circumstances may require.

C is a vertical flange, cast in one piece with the plate *a*, and extending above and below it.

D is a circular feeder, of the form represented in section in fig. 2. This feeder is so fitted and applied to the flange C, as to be held in place, and prevented from moving in a lateral direction, either when revolved or when at rest.

The feeder D, instead of being a straight and long bar, as in other machines, is made circular or curved, and without end, and is placed in the machine, represented in the accompanying drawings, directly over the path of the needles, which are shown at *a* and *b*.

Pins or points, *c c c*, project from the outer periphery of the feeder, at or near its lower edge. The object of these pins is to carry the cloth, and to insure its motion with the feeder as it revolves. It is evident that this revolving feeder may be made of any size larger or smaller than that here represented, without altering the nature of my invention, which consists, as before stated, in an endless revolving feeder, provided with pins or points upon its periphery by which the cloth is fed to the needles, as before stated. This endless feeder may be caused to revolve by any suitable means In the machine, represented in the accompanying drawings, the upper edge of the feeder D is furnished with ratchet-teeth, *d*.

E is an impelling-pawl, which engages with the teeth of *d*, and is attached to a rocking-arm, F, extending downwards from a horizontal rock-shaft, G, placed above and parallel with the cam-shaft H.

To the shaft G is imparted, in any appropriate manner, an oscillating or rocking motion, by means of which an intermittent rotary motion is communicated, through the pawl E, to the rotary feeder D, whenever the machine is in operation.

S is a bent arm, one end of which is attached to the bed-plate T, and which is made to extend over the cloth-feeder, and down in front of it. The other end of this arm rests against the cloth at the point where the sewing is performed, and is provided with a slot, *f*, of sufficient size to permit the passage of the needles, as well as the points of the feeder.

The other parts of the sewing-machine, as they constitute no part of my invention, need not be described, as my improvements may be applied to sewing-machines of any description. I will, however, briefly refer to some of the principal parts of the machine, and point out some of their relative positions with regard to the rotary feeder and pressure-spring.

K L are the two sliding bars, which carry the needles *a b*.

M is the cam, by which said slide-bars are operated.

N O are the thread-bobbins, one for each needle.

P is the driving-shaft.

Q R are the gears, which connect the driving and cam-shafts.

It is evident that a cloth-feeder, like that above described, requires no such removal or setting back, as is necessary at certain intervals when a straight bar or clamp is employed; consequently, my improvement not only saves the room which a long bar necessarily requires for its operation, but also the time which is lost in effecting the retraction of the bar, after the completion of a line of stitches.

The endless rotating feed may be composed of an endless chain, or made up of a series of hinged links, or it may be composed of an endless band of a flexible substance. These variations of construction being mere modifications, I consider to be involved in my invention.

*Claim.*

What I claim as my invention, and desire to secure by Letters Patent, is—

An endless rotary cloth-feeder, substantially such as herein described, in combination with a reciprocating eye-pointed piercing-needle.

In testimony whereof, I have hereunto set my signature.

JOTHAM S. CONANT.

Witnesses:

GEO. H. COLLINS,
THOS. J. BALDWIN.